United States Patent [19]
Imada

[11] Patent Number: 5,880,851
[45] Date of Patent: *Mar. 9, 1999

[54] IMAGE PROCESSING APPARATUS HAVING MEANS TO INTERRUPT ONE OF CONCURRENT SCANNING AND PRINTING OPERATIONS

[75] Inventor: Norio Imada, Tokyo, Japan

[73] Assignee: Kabushiki Kaisha Toshiba, Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 910,736

[22] Filed: Aug. 13, 1997

Related U.S. Application Data

[63] Continuation of Ser. No. 557,741, Nov. 13, 1995, abandoned.

[30] Foreign Application Priority Data

Dec. 26, 1994 [JP] Japan .................................. 6-321862

[51] Int. Cl.⁶ ..................................................... H04N 1/21
[52] U.S. Cl. .......................... 358/296; 358/444; 358/437; 399/87
[58] Field of Search ..................................... 358/296, 401, 358/501, 406, 434, 444, 496, 498, 437, 443; 399/1, 82, 83, 85, 87

[56] References Cited

U.S. PATENT DOCUMENTS

| | | | |
|---|---|---|---|
| 4,099,860 | 7/1978 | Connin | 399/87 |
| 4,708,461 | 11/1987 | Okuda et al. | 399/87 |
| 5,097,341 | 3/1992 | Forest | 399/87 |
| 5,107,339 | 4/1992 | Bertoni et al. | 358/296 |
| 5,245,368 | 9/1993 | Farrell et al. | 399/87 |
| 5,384,633 | 1/1995 | Boyd | 399/87 |
| 5,491,557 | 2/1996 | Nakajima et al. | 358/296 |
| 5,585,941 | 12/1996 | Maemura | 358/444 |

*Primary Examiner*—Peter S. Wong
*Assistant Examiner*—Derek J. Jardieu
*Attorney, Agent, or Firm*—Limbach & Limbach L.L.P.

[57] ABSTRACT

The image forming apparatus includes a reading device or reading a document image and generating image signals, a memory for storing image signals generated by the reading device and an image forming device for forming an image on an image carrier according to the image signals stored in the memory. The image forming apparatus has a control unit for controlling the apparatus to include the state wherein the reading operation and the image forming operation are executed simultaneously in a series of operations ranging from the reading operation by the reading device of the image forming apparatus to the image forming operation by the image forming device and further, has a breaking key for breaking one of the reading operation and the image forming operation while both of these operations are being executed simultaneously.

3 Claims, 7 Drawing Sheets

IMAGE PROCESSING APPARATUS HAVING MEANS TO INTERRUPT ONE OF CONCURRENT SCANNING AND PRINTING OPERATIONS

This is a continuation of application Ser. No. 08/557,741 filed on Nov. 13, 1995 now abandoned.

BACKGROUND OF THE INVENTION

1. Field of the Invention

The present invention relates to image forming apparatus such as, for instance, copying machines and the like, which are capable of simultaneously executing both an document image input operation wherein an image on a document is read and once stored in a memory device and an image forming operation wherein an image is formed by reading image information stored in a memory.

2. Description of the Related Art

So far, image forming apparatus such as copying machine and the like have been put to practical use, which are capable of simultaneously executing both a document image input operation to read and store a document image once in a memory device and an image forming operation to form an image by reading image information stored in a memory device.

In such copying machines, while a series of operations ranging from a document image input operation for storing document image information to an image forming operation for forming an image from the image information stored in a memory device are being executed simultaneously, even when user finds any setting error during the course of operations and desires to suspend either one of the operations, if user depresses a break key, both operation were suspended.

As described above, there are image forming apparatus such as copying machines and the like, which are capable of simultaneously executing both the document image input operation for reading an image of a document and once storing the read document image in a memory device and the image forming operation for reading image information out of the memory device and forming an image. In such apparatus, when user desires to select and suspend a desired operation in the state wherein a series of document image input operation for storing document image information and an image forming operation for forming an image from the image information stored in a memory device are being executed simultaneously, both operation are suspended. So, there was such a problem that if this apparatus is operated again there was a large time loss.

SUMMARY OF THE INVENTION

It is an object of the present invention to provide an image forming apparatus which is capable of suspending either one of a document image input operation and an image forming operation by selecting only the operation desired by user when both operations are being executed simultaneously.

The present invention will provide an image forming apparatus comprising means for reading a document image to generate image signals, means for storing the image signals generated by the reading means, means for forming an image on an image carrier according to the image signals stored in the storing means, means for controlling the apparatus to operate to include the state wherein the reading operation and the image forming operation are executed simultaneously in a series of operations ranging from the reading operation by the reading means to the image forming operation by the image forming means, and means for breaking only one of the reading operation and the image forming operation which are being executed simultaneously by the control of the controlling means.

DETAILED DESCRIPTION OF THE PREFERRED EMBODIMENTS

A first embodiment of the present invention will be described with reference to the attached drawings.

Figure 1:
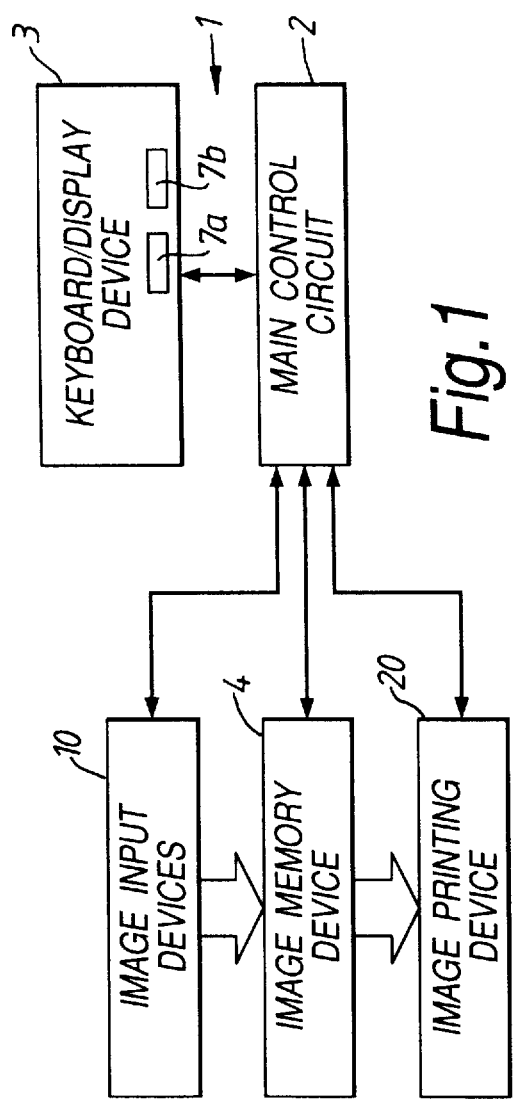
FIG. 1 is a block diagram showing the brief construction of an image forming apparatus involved in one embodiment of the present invention.

FIG. 1 shows the brief construction of an image forming apparatus of the present invention. The image forming apparatus 1 in the figure is comprised of a main control circuit 2 which performs the entire control, a keyboard/display device 3 which performs the input for operation, an image input device 10 which is a reading means to optically read document image information, an image memory device 4 which is a storage means such as a page memory and the like to store image information which is output from the image input device 10, and an image printing device 20 which is an image forming means to print images on recording material, that is, paper.

Figure 2:
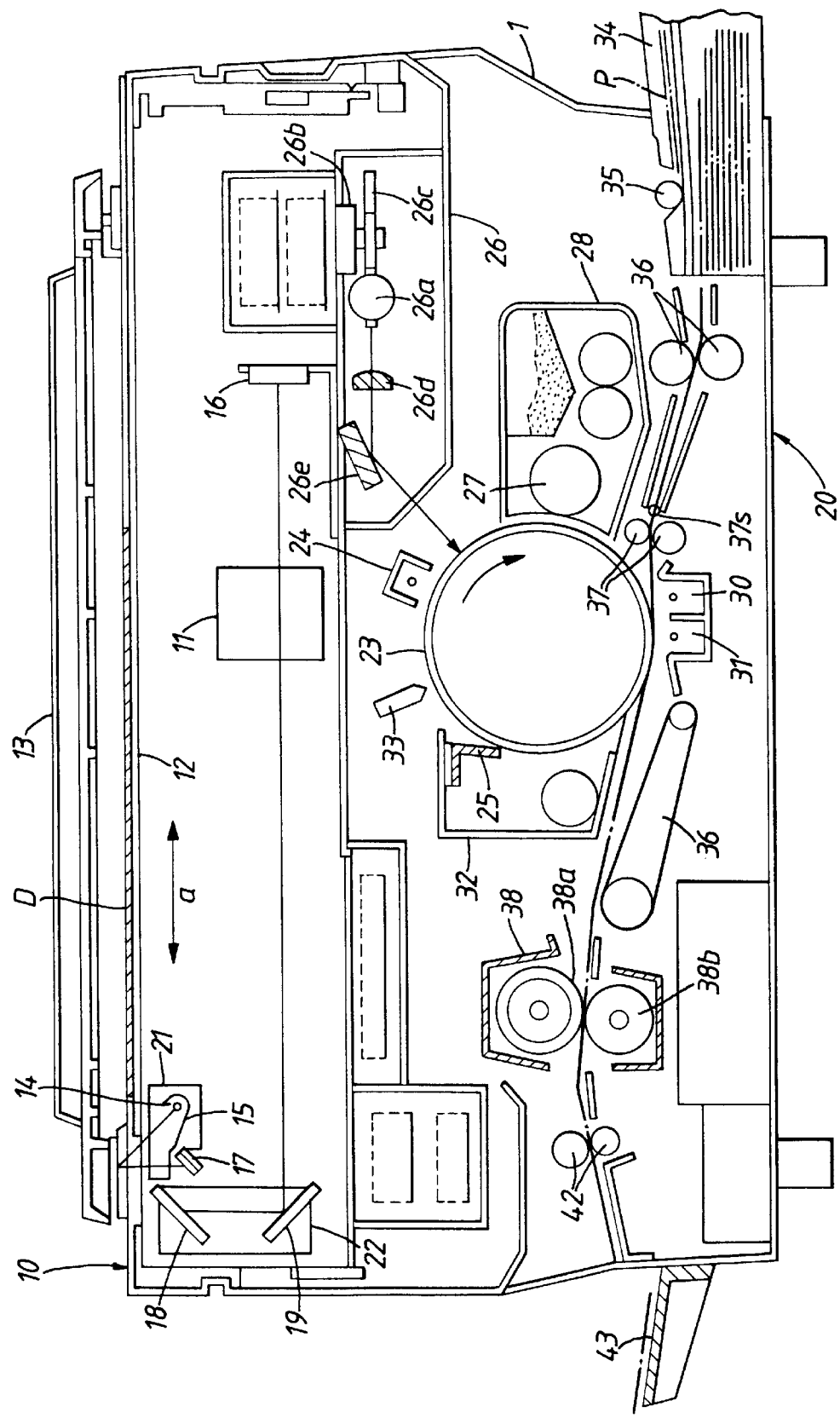
FIG. 2 is a sectional view showing the whole construction of the image forming apparatus of the present invention.

FIG. 2 is a sectional view showing the internal construction of the image forming apparatus 1.

The image input device 10 has a document table 12 on which a document D to be copied is placed, a document cover 13 which can be opened/closed to press down the document D placed on the document table 12, a light source 14 which illuminates the document D placed on the document table 12, and a CCD sensor 16 which photoelectrically converts the reflected light from the document D which is illuminated by the light source 14 into image information signals.

Further, there is arranged a reflector 15 at the side of the light source 14 which is for focusing the illumination light from the light source 14 on the document D efficiently.

Further, between the light source 14 and the CCD sensor 16 there are arranged mirrors 17, 18 and 19 for refracting a optical path through which the light from the document D passes to the CCD sensor, that is, the reflected light from the document D and a lens unit 11 which is for focusing the reflected light on the condensing surface of the CCD sensor 16.

The document D placed on the document table 12 is scanned and exposed when a scanning system comprising the light source 14 and the mirrors 17 to 19 is reciprocated along the lower surface of the document table 12 in the arrow direction a (the sub-scanning direction). In this case, the mirrors 18 and 19 are moved at a speed of ½ of the mirror 17 so as to maintain the optical path length of the mirrors 18 and 19. Further, the CCD sensor 16 scans a document image along the main scanning direction which is almost orthogonal to the sub-scanning direction and outputs density signals for each pixel.

The reflected light from the document resulting from the scanning by the scanning system, that is, the reflected light from the document D when illuminated by the light from the light source 14 is, after reflected on the mirrors 17 to 19, passes through the lens unit 11, led to the CCD sensor 16 and forms an image of the document D on the light receiving surface of the CCD sensor 16.

Further, the light source 14, the reflector 15 and the mirror 17 are provided on a first carriage 21, the mirrors 18 and 19 are provided on a second carriage 22, and these carriages 21 and 22 are moved by a motor (not shown), respectively.

The image printing device 20 has a photosensitive drum 23. The photosensitive drum 23 is in the cylindrical shape and rotated by a motor (not shown). When the photosensitive drum 23 is charged and applied with optical beams, an electrostatic latent image corresponding to an image on the document D is formed on the photosensitive drum 23.

Around the photosensitive drum 23, there are arranged a charger 24 which gives a desired electric potential to the photosensitive drum 23, a laser unit 26 which outputs laser beam to the photosensitive drum 23, which is turned ON/OFF according to image information from the image memory device 4, that is, image information to be copied or output, a developing unit 28 which develops the electrostatic latent image formed on the photosensitive drum 23 by the laser beam from the laser unit 26 by supplying a toner to the electrostatic latent image via a developing roller 27, a transfer unit 30 which transfers the toner image developed on the photosensitive drum 23 via the developing device 28 on a recording material, that is, paper supplied from a paper supply unit 30 comprising cassettes and the like, which will be described later, and a separation unit 31 which separates paper adsorbed on the photosensitive drum 23 in order.

Further, around the photosensitive drum 23 and at the downstream of the separation unit 31, there are arranged a cleaner unit 32 which removes the toner left on the surface of the photosensitive drum 23 and erases electric potential change generated on the photosensitive drum 23 by the laser beam using a cleaning blade 25, and a charge elimination lamp 33 which erases the electric potential on the photosensitive drum 23 for the next image formation in order.

The laser unit 26 is provided with a polygonal mirror 26c which is rotated by a mirror motor 26b in response to a semiconductor 26a, f θ lens 26d and a mirror 26e, and applies beams to the photosensitive drum 23.

Between the developing unit 28 and the transfer unit 30, there is provided the paper supply unit 34 which supplies paper P to the transfer unit 30 for the transfer of the toner image formed on the photosensitive drum 23.

Paper P taken out of the paper supply unit 34 by a paper supply roller 35 is conveyed and led to an aligning roller pair 37 by a conveyor roller pair 36 and then, guided by the aligning roller pair 37 and conveyed between the photosensitive drum 23 and the transfer unit 30 which is arranged opposite to the photosensitive drum 23 and the toner image on the photosensitive drum 23 is transferred on paper P by the transfer unit 30.

There is provided an aligning sensor 37s immediately before the aligning roller pair 37 in the conveying direction of paper P which is conveyed by the conveyor roller pair 36. This aligning sensor 37s is to detect paper P which is being conveyed. After this aligning sensor 37s is turned ON, the aligning roller pair 37 is kept stopped for a prescribed time and the leading edge of paper P is aligned, the aligning roller pair 37 starts to convey paper P so as to fit it to the end of a developed image on the photosensitive drum 23.

Further, in the direction at the rear stage of the transfer unit 30 wherein paper P with the toner image transferred via the transfer unit 30 is separated from the photosensitive drum 23, there are provided a fixing unit 38 for fixing the toner image on paper P and the conveyor roller pair 36 which is arranged between this fixing unit 38 and the transfer unit 30 for conveying paper P to the fixing unit 38.

The fixing unit 38 is provided with a heat roller 38a and a pressure roller 38b and fixes the toner image on paper P by heating and pressurizing it. Further, paper P with the toner image fixed by the fixing unit 38 is ejected on a receiving tray 43 by a discharge roller pair 42.

Figure 3:
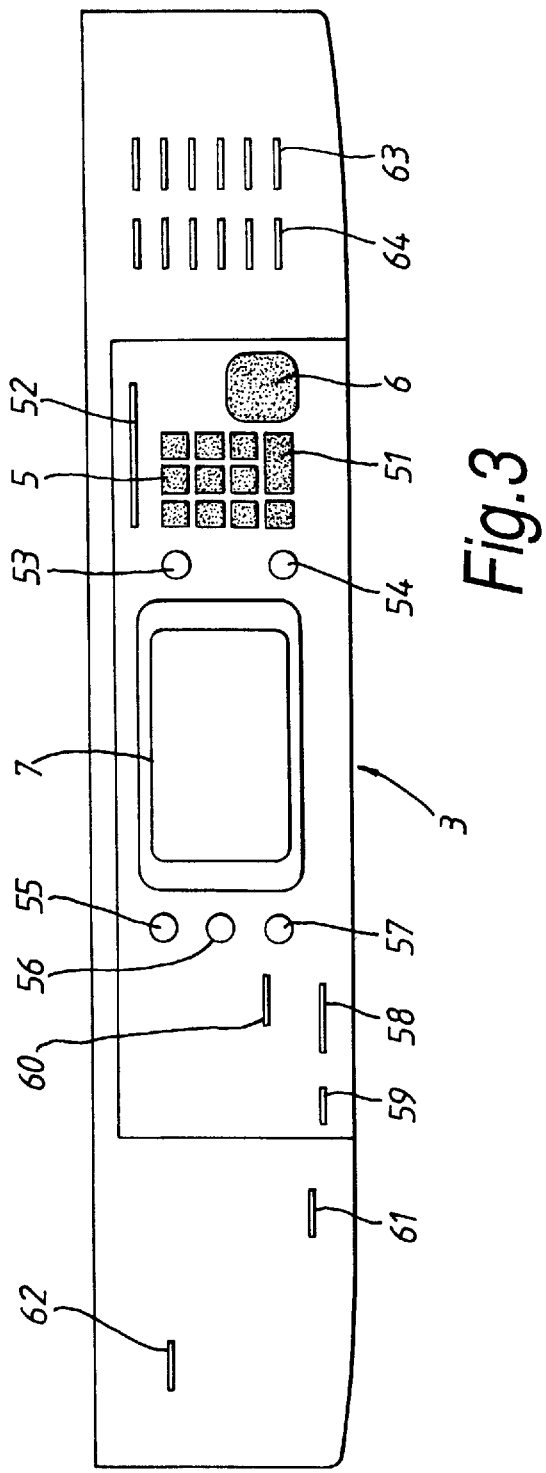
FIG. 3 is a plan view showing the brief construction of a keyboard/display device of the image forming apparatus of the present invention.

FIG. 3 is a diagram showing the brief construction of the keyboard/display device 3, comprising a numeric keypad 5, a start key 6, a touch panel display 7, a clear/stop key 51, a zoom key 52, a function key 53, a help key 54, a timer key 55, a preheating key 56, an interruption key 57, a density set key 58, an automatic exposure key 59, a cassette selection key 60, a sorter key 61, a counter key 62, a paper selection key 63 and a magnification selection key 64. The keyboard/display device 3 is arranged to the image forming apparatus 1, definitely, to either the image input device 10 or the image printing device 20.

The numeric keypad 5 is for inputting numerical figures for setting the number of copies.

The start key 6 is for inputting the start of copying. The touch panel display 7 is provided with a transparent touch sensor panel on the screen of its liquid crystal display for various inputs to be displayed.

The clear/stop key 51 is a key which is used to clear set inputs and stop the copying operations.

The zoom key 52 is a key which is used to set copying magnification from 100% to 25% contraction and 800% expansion.

The function key 53 is a key which is used to return mode and display to the initial state.

The help key 54 is a key which is used to check functions.

The timer key 55 is a key which is used to set a weekly timer. For instance, the timer is set so as to turn ON the power source of the image forming apparatus 1 at a prescribed time in the morning and turn Off the power source at a prescribed time in the night.

The preheating key 56 is a key which is used to set preheating of the image forming apparatus 1.

The interruption key 57 is a key which is used to set an interruption during the copying operation.

The density set key 58 is a key which is used to make a set density "thin" or "thick".

The automatic exposure key 59 is a key which is used to automatically adjust the exposure.

The cassette selection key 60 is a key which is used to select plural cassettes (not shown) in which paper P is set.

The sorter key 61 is a key which is used to set the cumulative number of counted copies.

The paper selection key 63 is a mode key which is used to select a paper size.

The magnification select key 64 is a mode key which is used to select a magnification.

On the top of the document table 12, there is the document cover 13 arranged to keep a document D closely contact the document table 12. The document cover 13 can be replaced by, for instance, ADF, that is, an automatic document feeder according to size of the image forming apparatus 1 or its copying capacity.

Figure 4:
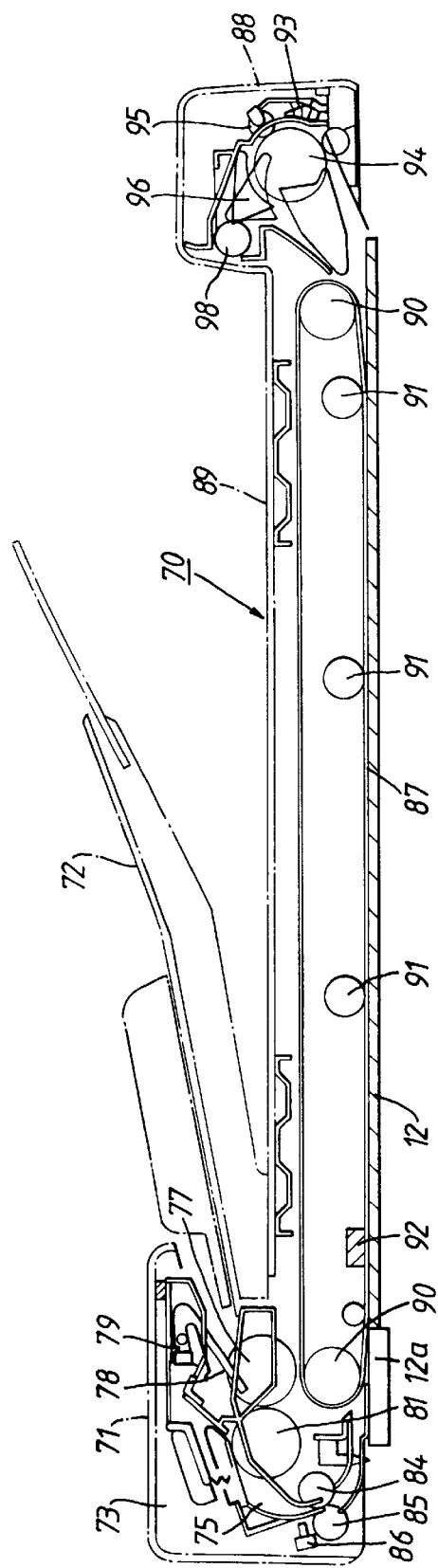
FIG. 4 is a sectional view of an automatic document feeder which is used in the image forming apparatus of the present invention.

FIG. 4 is a diagram showing the brief construction of an automatic document feeder. The automatic document feeder 70 is provided on the document table 12 and a document D is fed to the document table 12 from the automatic document feeder 70.

The automatic document feeder 70 is in the modular construction and the rear edge of the cover 71 is mounted to the top rear edge of the document feeder by a hinge device (not shown) in such a manner that it can be opened/closed and that the document table 12 is opened by rotating the entire automatic document feeder 70 as necessary.

As shown in FIG. 4, a document feeding tray 72 which is capable of collectively holding plural documents D is provided at the slightly top leftward area of the cover 71. In this case, documents D are placed on the document feeding tray 72 with the image forming surface placed upward and the first sheet on the top. There is provided a feeder unit 73 which takes out documents D held on the document feeding tray 72 with the image forming surface placed on the top from the bottom one by one and supplies to one end side (the left end side in the figure) of the document table 12. The feeder unit 73 is in the construction as shown below.

That is, a paper feeding path 75 in the horizontal U-shape is provided so as to connect the skew lower end of the document feeding tray 72 with the top surface of a document stopper 12a arranged along the left edge of the document table 12 and documents D are led with the image forming side placed downward. At the upper stream of this paper feeding path 75, there are provided a pickup roller 77 to take out documents D, a weight plate 78 to press documents D against the pickup roller 77, an empty sensor 79 to detect the set state of documents D on the document feeding tray 72, and the like. Furthermore, a paper feeding roller 81 is arranged in the document take-out direction of he pickup roller 77 so as to feed documents D one by one. Further, at the downstream of the paper feeding path 75, an aligning roller 84 as a registration roller pair for correction of skew and feed timing of documents D and a registration sensor 85 are provided and in addition, a registration sensor 86 is provided in front of the aligning roller 84 for timing the operation of the aligning roller 84 and the turn roller 85 by detecting documents D.

A document conveying belt 87 is put on the top of the document table 12 covering it. A document D fed by the feeder unit 73 is conveyed from one end (the left end side) of the document table 12 to another end (the right end side). The document D is ejected to a receiver 89 which is formed on the top of the cover 71 by a discharge unit 88 provided at the right side of the cover 71.

The document conveying belt 87 is a wide endless belt with a white outer surface put over a pair of rollers 90 and 90 and is driven in both the forward and backward directions by a belt driving mechanism (not shown). Further, the back side of the inner circumference of the document conveying belt 87 is provided with plural belt press down rollers 91 to press the belt surface against the document table 12 and a set switch 92 to detect the opening/closing state of the automatic document feeder.

The discharge unit 88 is in the construction as shown below. A document discharge path 93 in the horizontal U-shape is provided to connect the right edge of the document table 12 with the receiver 89 and a document D is discharged with the document forming surface turned upward. At the middle of the document discharge path 93 there are a conveyor roller 94, a pinch roller 95 which presses the document D against the conveyor roller 94, a discharge sensor 96 which is a document sensor to detect the trailing edge of the document D which is sent in the discharging direction and the like. Further, at the downstream side of the document discharge path 93, a discharge roller 98 is provided.

Figure 5:
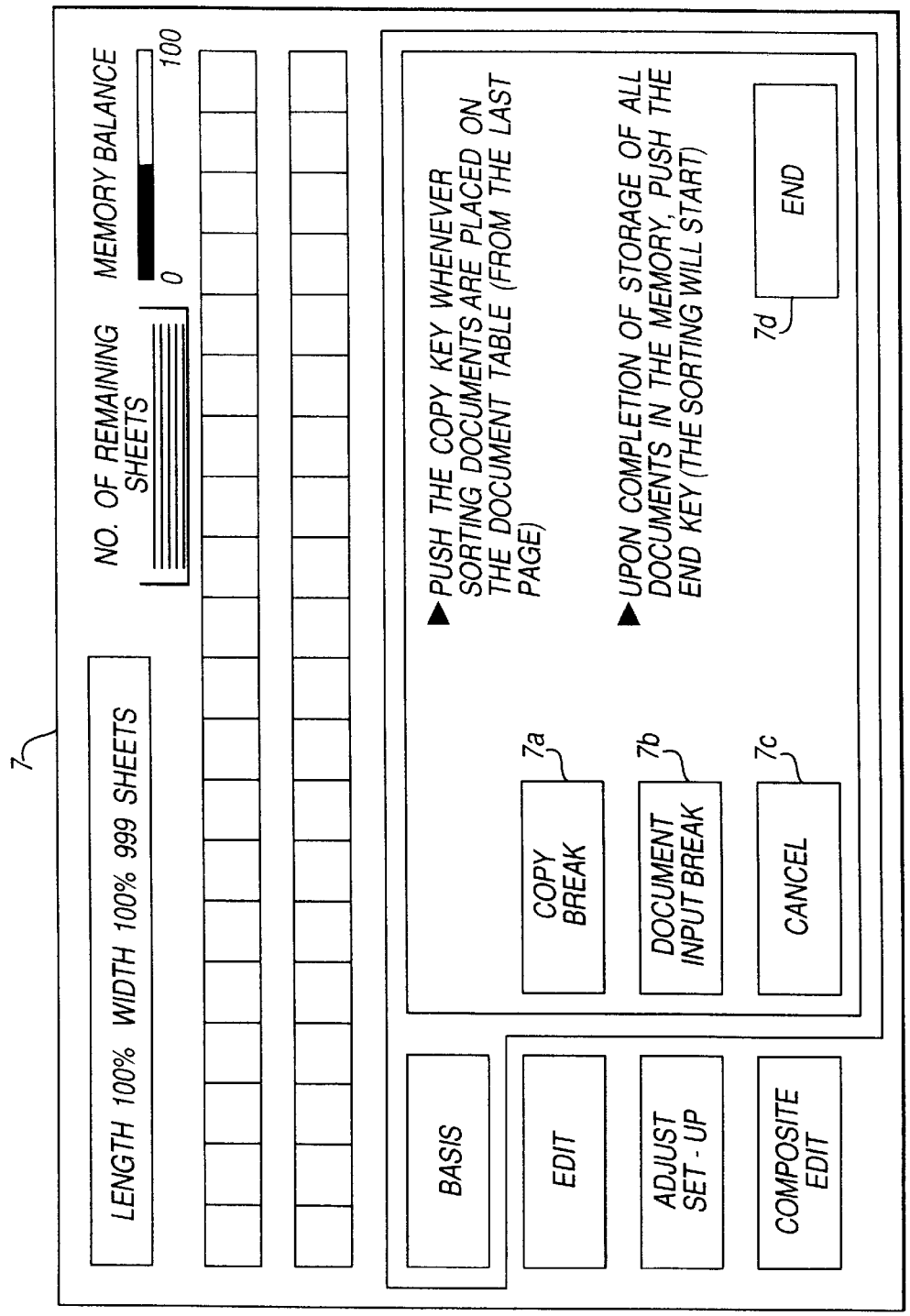
FIG. 5 is a plan view showing a display example of a touch panel display which is used in the image forming apparatus of the present invention.

FIG. 5 shows a display example of various operating keys which are input through the touch panel display 7, and magnification, the number of sheets, the number of remaining sheets and the memory balance of the image memory device 4 are displayed and also, four mode select keys; BASIS, EDIT, ADJUST SET-UP and COMPOSITE EDIT were set and displayed.

In this embodiment, the basic mode was selected, a copy break key 7a, a document input break key 7b, a cancel key 7c and an end key 7d were set and displayed.

Depressing the copy break key 7a does mean the break of a job currently in the printing operation by the image printing device 20 and the printing operation is suspended and image information relative to the job which accumulated in the image memory device is deleted.

Depressing the document input break key 7b does mean the break of a job which is currently in the document reading by the image input device and the document reading is suspended and image information relative to the job accumulated in the image memory device 4 is deleted.

Next, the document image input operation and the image printing operation of the image forming apparatus in this embodiment will be described.

The document image input operation is a series of operations ranging from the document reading by the image input device 10 to the storage of the read image information in the image memory device 4. First, user places a document on the document table 12 and depresses the start key 6. When the start key 6 is depressed, the main control circuit 2 converts the image information read from the document by the image input device 10 into digital signals which are then transferred to the image memory device 4 and stored therein. If a document is in plural sheets, this operation is repeated and plural image information are stored in the image memory device 4.

When the document image input operation is completed, the end key 7d of the touch panel display 7 is depressed by user. In response to this depressing of the end key 7d, the main control circuit 2 reads out the image information stored in the image memory device 4 and the image printing operation is executed by printing the image information in order of storage on recording paper by the image printing device 20. Further, if the number of printing sheets for one document image information is specified, one document image information is printed in the number of specified sheets.

If the image input of a document is made using and automatic document feeder 70, the main control circuit 2 controls so as to start the image printing operation even when the end key 7d is not depressed.

User achieves the copying by inputting the document image and have the image forming apparatus execute the image printing operation. Further, if an excess empty capacity is available in the image memory device 4 when the document image input operation is completed, the main control circuit 2 controls the apparatus so that it is possible to use the image input device 10 even when the image printing device 20 of the image forming apparatus 1 is performing the document printing operation. That is, it is possible to promote the work efficiency by allowing the image input operation of a next new document even in the state wherein the image printing operation is started.

Next, the functions of the document input break key 7b and the copy break key 7a in this embodiment will be described.

First, when user placed a document on the document table 12 and is performing the document image input operation without using the automatic document feeder 70, the depressing of the end key 7d does mean to shift to the start of the next image printing operation as described above. Here, if the document input break key 7b is depressed without depressing the end key 7d, the main control circuit 2 controls so as to return to the state before starting the document image input operation without shifting to the start of the next image printing operation. At the same time, the image information which was stored in the image memory device 4 by the last document image input operation is also deleted. Here, when deleting the stored image information, user may be asked by displaying "CAN IMAGE INFORMATION BE DELETED?" on the touch panel display 7.

If the document input break key 7b is depressed while the document image input operation is being performed using the automatic document feeder 70, the main control circuit 2 controls so as to stop the operation of the automatic document feeder 70, delete the image information so far stored in the image memory device 4 and return to the state before starting the document image input operation. The reason for deleting image information stored in the image memory device 4 simultaneously with depression of the document input break key 7b to suspend the document reading is because "Break" here is to cancel the document reading operation so far made. The purposes of user to depress the document input break key 7b are to input another document by canceling the already read and stored image information and the like.

Further, if the copy break key 7a is depressed in the state wherein the image printing operation has been started, the printing operation will be stopped and the image information which are stored in the image memory device 4 and subject to the printing will be deleted. The reason for simultaneously deleting image information stored in the image memory device 4 is because "Break" here is to cancel the document image input operation and the image printing operation so far made. The purposes of user to depress the copy break key 7a are to detect such malfunctions as image information started to be printed are not copied at a desired magnification, image information are not copied in recording paper in desired size, etc. and discontinue the printing any more.

Figure 6:
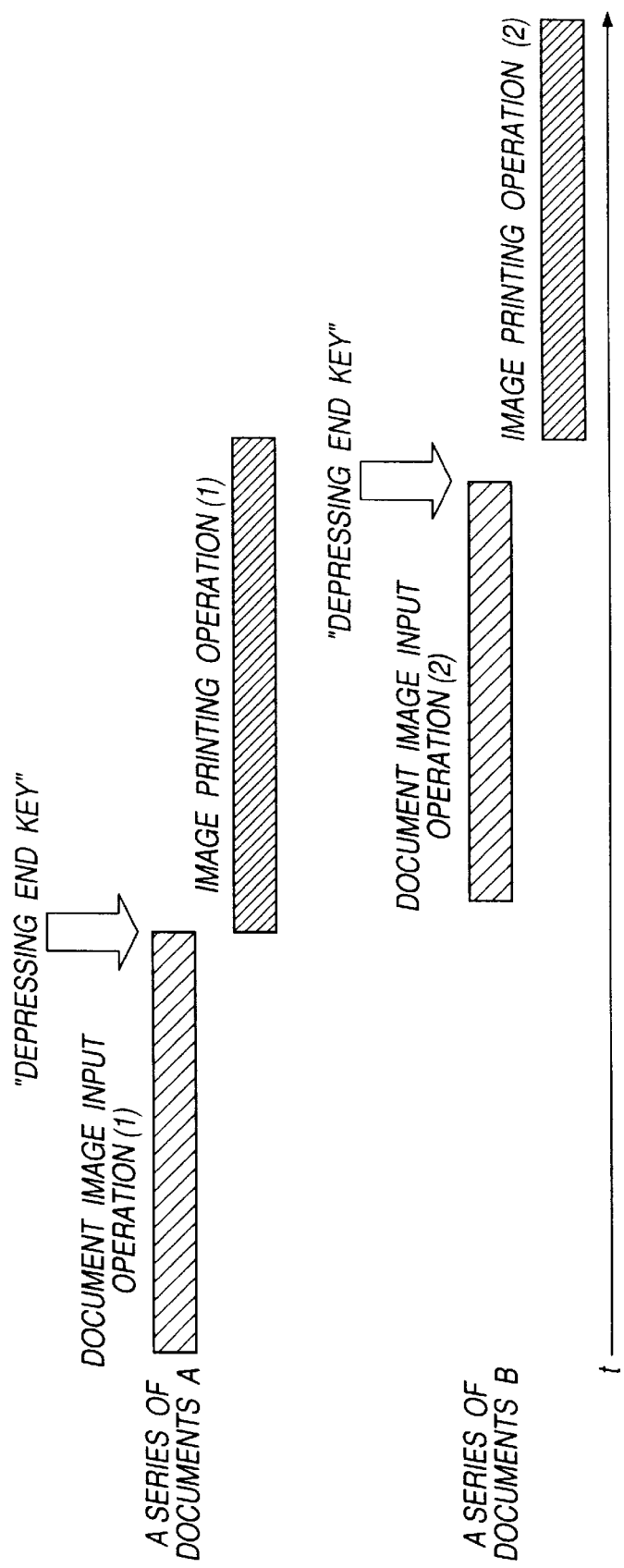
FIG. 6 is a time chart for explaining the state of execution of the document image input operation and the image printing operation of the image forming apparatus of the present invention.

FIG. 6 shows a time chart of the document image input operation and the image printing operation of a series of documents A and a series of documents B. If the image input operation (2) for the next series of documents B is performed in the state wherein the image printing operation 1 is started for a series of documents A, the state will result, wherein the image printing operation (1) and the document image input operation (2) are executed simultaneously. When the document input break key 7b is depressed in this state, only the image information stored in the image memory device 4 is deleted by the document image input operation (2) for a series of documents B if the automatic document feeder 70 is not used, that is, if the document image input operation (2) is performed while manually placing a document on the document table 12. By this deletion of the stored image information, the execution of the image printing operation (2) for a series of documents B is prevented. When the document image input operation (2) is executed using the automatic document feeder 70, the operation of the automatic document feeder 70 is stopped, only the image information stored in the image memory device 4 is deleted and thus, the execution of the image printing operation (2) for a series of documents B according to this stored image information is prevented. At this time, the image printing operation (1) for a series of documents A is continuously executed without being stopped.

In the state wherein the image printing operation (1) for a series of documents A and the document image input operation (2) for a series of documents B are simultaneously executed, if the copy break key 7a is depressed, the image printing operation currently being executed is stopped and only image information stored in the image memory device 4 and subject to the printing will be deleted.

On the other hand, if only one operation break key is available on the keyboard/display device 3 as in a conventional image forming apparatus, both the image printing operation and the document image input operation are suspended and all the image information stored in the image memory device 4 will be deleted.

Figure 7:
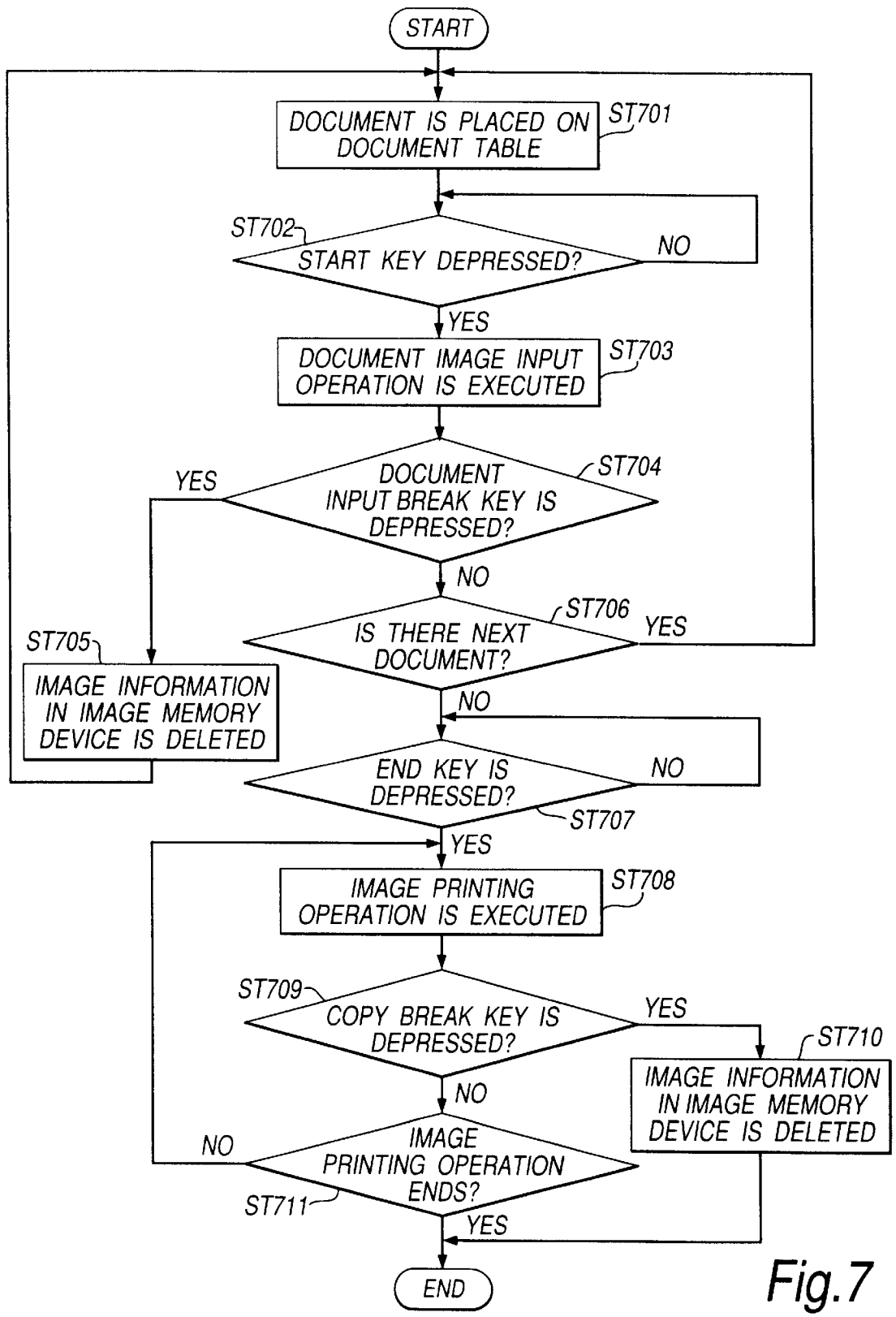
FIG. 7 is a flowchart for explaining the image input operation and the image printing operation by setting a document one by one in the image forming apparatus of the present invention.
Figure 8:
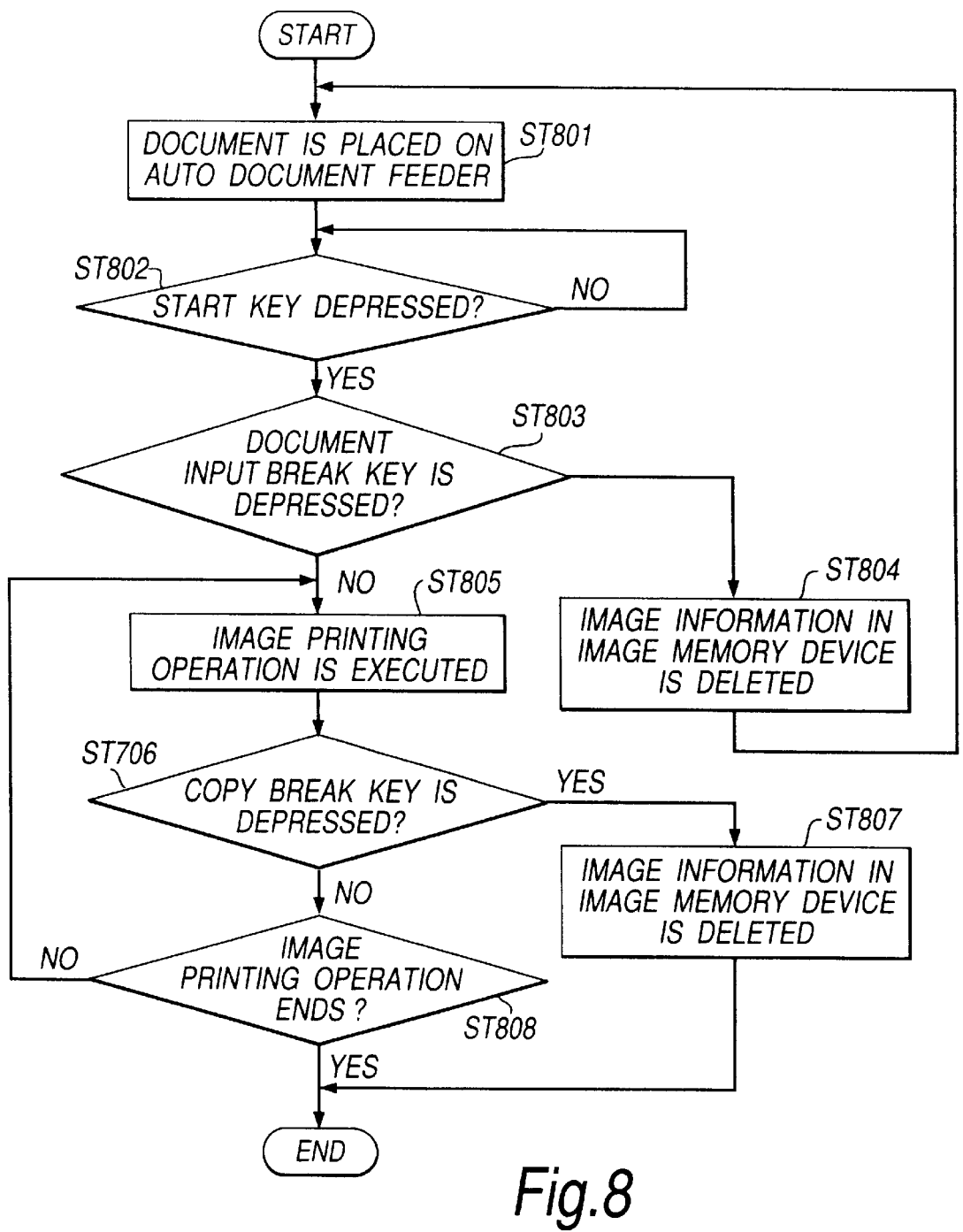
FIG. 8 is a flowchart for explaining the document image input operation and the image printing operation using the automatic document feeder shown in FIG. 4 in the image forming apparatus of the present invention.

Next, the document image input operation and the image printing operation in the image forming apparatus 1 in the construction as described above will be described with reference to the flow charts shown in FIGS. 7 and 8.

First, the operating procedures when the automatic document feeder 70 is not used, that is, when a document is manually placed on the document table 12 will be described with reference to the flowchart shown in FIG. 7.

A document D is manually placed on the document table 12 by user (Step ST701) and the start key 6 of the keyboard/display device 3 is depressed (Step ST702).

When the start key 6 is depressed, the main control circuit 2 executes the document image input by the image input device 10 and stores image information in the image memory device 4 (Step ST703). Here, to suspend the document image input, the document input break key 7b is depressed (Step ST704), the input operation of the image input device 10 is suspended and the image information stored in the image memory device 4 up to immediately before the document input break key 7b is depressed is deleted (Step ST705).

When there is a document to be next input (Step ST706), the operation returns to Step ST701 and when the next document is placed on the document table 12 and the start key 6 is depressed, the main control circuit 2 performs the document image input operation by the image input device 10 and stores image information in the image memory device 4.

Upon completion of the document input, the end key 7d is depressed (Step ST707). The main control circuit 2, when the end key 7d is depressed, executes the image printing operation by the image printing device 20 according to the image information stored in the image memory device 4 (Step ST708). If the copy break key 7a is depressed here (Step ST709), the main control circuit 2 suspends the printing operation of the image printing device 20 and deletes the image information stored in the image memory device 4 and subject to the printing operation (Step ST710).

When the image printing is to be executed continuously, the operation returns to Step ST708 and if the image printing is to be terminated, a series of operations are all terminated (Step ST711).

Next, the operating procedures when the automatic document feeder 70 is used will be described with reference to the flow chart shown in FIG. 8.

A document is placed on the automatic document feeder 70 provided on the document table 12 (Step 801) and the start key 6 of the keyboard/display device 3 is depressed (Step ST802). When the document input break key 7b is depressed here (Step ST803), the main control circuit 2 suspends the input operation of the image input device 10 and deletes the image information which is stored in the image memory device 4 for the printing (Step ST804).

The main control circuit 2, when the start key 6 is depressed, executes the document image input of a document placed on the automatic document feeder 70 by the image input device 10 and stores image information in the image memory device 4. Upon completion of the document image input using the automatic document feeder 70, the image printing operation is executed automatically by the image printing device 20 using the image information stored in the image memory device 4 (Step ST805).

If the copy break key 7a is depressed when the image printing operation is being executed by the image printing device 20 (Step ST806), the main control circuit 2 suspends the printing operation of the image printing device 20 and deletes the image information which is stored in the image memory device 4 for the printing (Step ST807).

When the image printing is to be executed continuously, the operation returns to Step ST805 and when the image printing is to be terminated, a series of operations are all terminated (Step ST808).

According to the embodiment as described above, when user is executing both the document image input operation and the image printing operation simultaneously, it is possible for user to select and suspend the desired operation only.

According to the present invention as described above in detail, it is possible to provide an image forming apparatus which allows user to select and suspend a desired operation only in the state wherein user is executing both the document image input operation and the image printing operation simultaneously.

What is claimed is:

1. An image forming apparatus comprising:
   means for reading a first document comprising a plurality of pages and a second document comprising a plurality of pages to generate image signals corresponding to respective documents;
   means for storing the image signals of all pages of the first document generated by the reading means;
   means for forming images on an image carrier according to the image signals of all pages of the first document stored in the storing means;
   means for controlling the image forming means to form the images of all pages of the first document stored in the storing means, and controlling the reading means to read all pages of the second document while the image forming means forms the images of all pages of the first document; and
   means for breaking only an image forming operation of the image forming means for the first document while the image forming operation and a reading operation of the reading means for the second document are executed simultaneously.

2. An image forming apparatus as claimed in claim 1 further comprising means for deleting image signals stored in the storing means corresponding to the first document when the image forming operation for the first document is broken by the breaking means.

3. An image forming apparatus comprising:
   means for reading a first document comprising a plurality of pages and a second document comprising a plurality of pages to generate image signals corresponding to respective documents;
   means for storing the image signals of all pages of the first document generated by the reading means;
   means for forming images on an image carrier according to the image signals of all pages of the first document stored in the storing means;
   means for controlling the image forming means to form the images of all pages of the first document stored in the storing means, and controlling the reading means to read all pages of the second document while the image forming means forms the images of all pages of the first document;
   means for breaking only a reading operation of the reading means for the second document while an image forming operation of the image forming means for the first document and the reading operation are executed simultaneously; and
   means for deleting the image signals corresponding to the second document, which are stored before operation of the breaking means in the storing means, when the reading operation for the second document is broken by the breaking means to prevent the operation of the image forming means using the deleted image signals.

* * * * *